M. L. WILLIAMS.
FRICTION CLUTCH.
APPLICATION FILED DEC. 7, 1906.
902,515.
Patented Oct. 27, 1908.
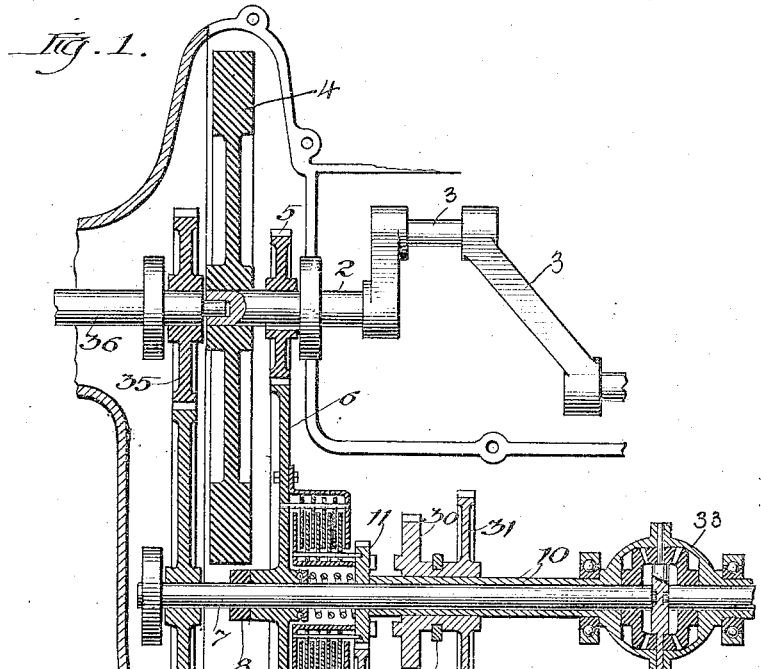
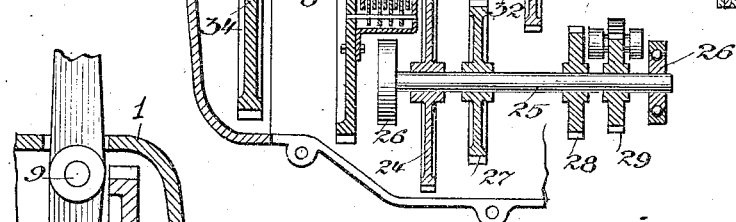
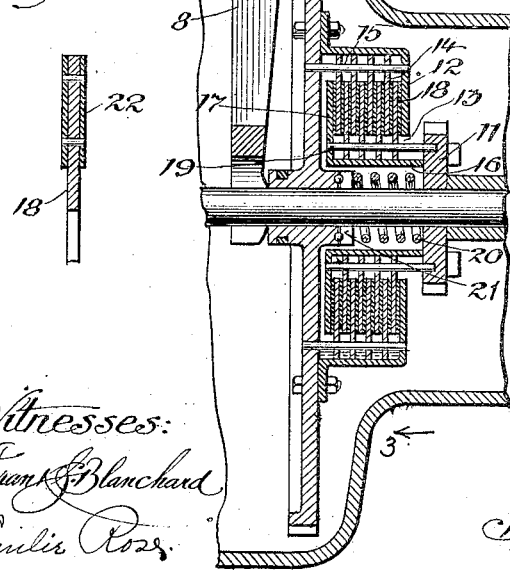
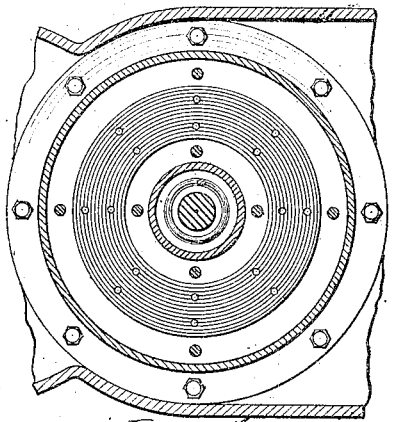
Witnesses:
Frank Blanchard
Emilie Rose
Inventor:
Martin L. Williams
By Albert N. Graves,
Attorney

UNITED STATES PATENT OFFICE.

MARTIN L. WILLIAMS, OF SOUTH BEND, INDIANA.

FRICTION-CLUTCH.

No. 902,515.  Specification of Letters Patent.  Patented Oct. 27, 1908.

Original application filed December 26, 1905, Serial No. 293,290. Divided and this application filed December 7, 1906. Serial No. 346,769.

*To all whom it may concern:*

Be it known that I, MARTIN L. WILLIAMS, a citizen of the United States, residing at South Bend, in the county of St. Joseph and State of Indiana, have invented certain new and useful Improvements in Friction-Clutches, of which the following is a specification.

This invention relates to improvements in friction clutches, and has among its salient objects to provide a clutch built up of a series of disks presenting a relatively large frictional area; to provide a construction of relatively few parts protected as to its interior mechanism; to provide a construction which is normally held spring-pressed in driving position; to provide a construction which is direct acting and dispenses with toggle and other intermediate actuating mechanisms; to provide simple and reliable means for engaging and disengaging the friction disks; to provide a compact device having a relatively large area of friction contact surface and corresponding efficiency; to provide a construction that may be kept thoroughly lubricated and, if preferred, submerged in oil; and in general to provide an improved construction of the character referred to.

The invention consists in the matters hereinafter described, and more particularly pointed out in the appended claims.

Referring to the drawings—Figure 1 is a horizontal sectional view of my device, shown in connection with parts of the transmission gearing of a vehicle wheel; Fig. 2 is an enlarged axial sectional view of the clutch taken at right angles through the view of the clutch shown in Fig. 1, parts being broken away to reduce the size of the drawing. Fig. 3 is a transverse sectional view taken on line 2—2 of Fig. 2 and looking in the direction of the arrows; the parts, however, being considerably enlarged; Fig. 4 is a fragmentary detail of one of the clutch disks showing the manner in which the friction washers are secured to the disks.

Referring to the drawing, 1 designates an axle member made in the form of a hollow casing in which the transmission gearing embodying my clutch mechanism is mounted. Describing this gearing, 2 designates the main shaft provided with a series of cranks, 3, 3, and driven by any suitable power. Upon one of the alined ends of the main shaft 2, is keyed or otherwise secured the usual fly-wheel 4. Upon that end of the main shaft shown is rigidly secured a driving gear 5 which intermeshes with a larger gear 6, mounted upon a counter shaft 7; the latter gear carrying the driving member of the friction clutch hereinafter to be described. The gear 6 is loosely mounted on the counter shaft 7 and is shifted freely endwise thereon by a clutch lever 8 fulcrumed at 9 in the upper part of the axle casing, and extending out of the latter to a point accessible to the operator.

Upon the counter shaft 7, at the side of the clutch gear remote from the clutch lever, is journaled an externally square sleeve 10, and between the clutch and sleeve is mounted a loose spur-gear 11 which carries the driven member of a friction clutch hereinafter described.

Describing now the construction of the clutch members proper, and more particularly the driving member, a cylindric casing 12 is mounted upon the gear 6, arranged concentric with the counter shaft and provided with an axial opening 13. Within said casing is arranged a series of friction disks 14, the external diameters of which are slightly less than the internal diameter of the casing 12, and these disks are held against rotative movement within the casing by means of a plurality of through pins 15 extending through gear 6 and the casing 12 and through the several disks, in parallelism with the counter shaft and at angularly separated points, as seen clearly in Figs. 2 and 3. The friction disks 14 are freely shiftable upon said pins 15.

Describing now the driven friction member, the spur-gear 11 carries a sleeve 16, which extends inwardly through central openings in the friction disks 14, and said sleeve 16 is provided at its inner end with a radial right-angled flange 17 which overlaps the innermost one of the series of disks 14. Interposed between the friction disks 14 are arranged coöperating disks 18, which are connected non-rotatably to the spur-gear 11 by means of a plurality of through pins 19 extending from the gear 11 through suitable openings in the inner perimeters of said disks and into the flange 17. These disks are similarly shiftable upon the pins 19, from which it follows that if the clutch gear be shifted bodily from the spur gear 11

11 (the latter being held against endwise movement, as hereinbefore described), the two internested sets of friction disks will be brought into clamping frictional engagement with each other and the movement of rotation of the clutch gear imparted to the spur-gear. In order to hold the disks normally compressed into frictional engagement with each other a coiled expansion spring 20 is interposed between the face of the gear 11 and the hub of the gear 6; an anti-friction bearing washer 21 being interposed between one end of the spring and the hub of the driving gear 6. The two sets of friction disks are desirably made of suitable metal, and in order to insure an ample frictional engagement between the parts, I apply to one set of said disks,—the driven disks 18 in the present instance, fibrous coverings 22. I have found vulcanized fiber, commonly termed red fiber, to be highly satisfactory for this purpose; this material having the property of affording a strong frictional hold between itself and the smooth metal plates under pressure, notwithstanding the fiber may be saturated with oil.

Describing now the manner in which the rotation of the clutch gear 5 is imparted to the various driven parts, and referring to Fig. 1, it will be noted that the spur-gear 11 is shown as intermeshing with another gear 24 mounted upon a change speed shaft 25 which is journaled in suitable bearings 26 to extend parallel with the counter shaft. The shaft 25 carries additional gears, 27, 28 and 29, of varying diameter; all of these gears upon this shaft being rigid therewith. Upon the sleeve 10 is splined a pair of gears 30 and 31, these gears being connected with each other and shiftable by means of a shipping lever 32, the fork of which engages a groove between the gears. In the position of the parts shown in Fig. 1 the mechanism is set in its intermediate speed position; the shaft 25 being rotated through the gears 11 and 24, and gear 27 being in mesh with gear 30 and thus rotating the sleeve 10.

The sleeve 10 carries one member of a differential gear mechanism, designated as a whole 33 (more fully shown and described in the application Serial No. 293,290, of which this is a division) which rotates the counter shaft 7. On the opposite end of the shaft 7 is rigidly secured a gear 34 intermeshing with a gear 35 which is rigidly connected with a secondary shaft 36 which drives the wheel.

Describing now briefly the operation of the clutch, the disks being held in their normal frictional engagement by the action of the spring 20, power is communicated to the main shaft 2 carrying a driving gear 5, which in turn drives the intermeshing gear 6. The rotation of the gear 6 drives the clutch disks 14, which in turn drive the disks 18 and the connected gear 11. To disengage the friction disks, thus throwing the clutch mechanism out of operative engagement, the operator forces the lever 8 against the hub of the gear 6 (which, as heretofore described, is shiftable on the shaft 7) shifting said gear against the action of the spring 20, which operation carries the disks 14 out of frictional engagement with the disks 18.

I have described my device as used in connection with an automobile, but it is obvious that my clutch mechanism may be used in any suitable transmission gearing without in any manner departing from the spirit of the invention.

I claim as my invention:

1. In a power transmission mechanism, a friction clutch mechanism comprising a gear body, a circular casing mounted on one side of said gear body, and provided at its outer edge with a closed side portion centrally apertured, a plurality of supporting rods arranged near the periphery of said casing, each rod having its ends seated respectively in the gear body and in said side portion, and all arranged to extend through said casing parallel with the axis of the rotation of the gear body, a set of friction disks, each having its periphery suitably apertured and movably fitted upon said supporting rods, a second gear body mounted concentric with the first gear body, a tubular supporting member mounted upon said second gear body and extending freely through the aperture in said circular casing member, and provided at its end remote from the second gear body with an annular out-turned flange, a set of supporting rods mounted adjacent to the periphery of said tubular member, each of said rods having its ends seated in the second gear body and in the annular flange of the tubular supporting member, a set of friction disks, each being suitably apertured and movably fitted upon said second set of supporting rods, the peripheral portions of said latter disks being interposed between and alternated with the perimetral portions of the first set of disks, and means for bodily shifting one of said gear bodies and the supports carried thereby axially from and toward the opposite gear body, whereby said friction disks are brought into, or carried out of, bearing engagement with each other.

2. In a power transmission mechanism, a friction clutch mechanism comprising a gear body, a casing mounted on one side of said gear body, and provided at its outer edge with an annular flange, a plurality of supporting rods, each rod having its ends seated respectively in the gear body and in said annular flange, a set of friction disks movably fitted upon said supporting rods, a second gear body mounted concentric with the first gear body, a tubular supporting member mounted upon said second gear body and extending freely through the opening formed by said annular flange, and provided at its end remote from the second gear body with an annular out-turned flange, a set of supporting rods, each of said rods having its ends seated in the second gear body and in the annular flange portion of the tubular supporting member, a set of friction disks movably fitted upon said second set of supporting rods, the friction disks of one set being arranged to overlap, and being alternated with the friction disks of the other set, and means for bodily shifting said disks into or out of bearing engagement with each other.

3. In a power transmission mechanism, a friction clutch mechanism comprising a gear body, a circular casing mounted on one side of said gear body and provided at its outer edge with an inturned annular flange, a plurality of supporting rods rigidly seated near the periphery of said casing and extending through said casing, a set of friction disks movably fitted upon said supporting rods, a second gear body mounted concentric with the first gear body, a tubular supporting member mounted upon said second gear body and extending through the opening formed by said annular flange, an annular out-turned flange upon the end of said tubular member remote from said second gear body, a plurality of supporting rods, each rod having its end seated in said second gear body and the out-turned flange of said tubular member, a set of friction disks movably fitted upon said second set of supporting rods and interjected with the first set of friction disks, a spring mechanism for holding said disks normally in operative frictional engagement, and a simple leverage mechanism for disengaging the sets of friction disks.

MARTIN L. WILLIAMS.

Witnesses:
EMILIE ROSE,
FRANK G. BELKNAP.